United States Patent
Major

(10) Patent No.: US 12,213,470 B1
(45) Date of Patent: Feb. 4, 2025

(54) FISHING LURE WITH BALL CHAIN

(71) Applicant: Berry Mtn., Inc., Liverpool, PA (US)

(72) Inventor: Jarrod Burk Major, Liverpool, PA (US)

(73) Assignee: Berry Mtn., Inc., Liverpool, PA (US)

( * ) Notice: Subject to any disclaimer, the term of this patent is extended or adjusted under 35 U.S.C. 154(b) by 120 days.

(21) Appl. No.: 17/962,586

(22) Filed: Oct. 10, 2022

Related U.S. Application Data

(60) Provisional application No. 63/254,614, filed on Oct. 12, 2021.

(51) Int. Cl.
*A01K 85/00* (2006.01)

(52) U.S. Cl.
CPC ................................ *A01K 85/1821* (2022.02)

(58) Field of Classification Search
CPC ........................ A01K 85/1821; A01K 85/1811
See application file for complete search history.

(56) References Cited

U.S. PATENT DOCUMENTS

| | | | | |
|---|---|---|---|---|
| 3,134,190 | A * | 5/1964 | Triplett | A01K 85/02 43/42.36 |
| 8,091,271 | B2 | 1/2012 | Mayer | |
| 8,458,950 | B2 | 6/2013 | Mayer | |
| 9,433,196 | B1 * | 9/2016 | Micelli | A01K 85/18 |
| 11,369,098 | B2 * | 6/2022 | Tainaka | A01K 91/04 |
| 2009/0172993 | A1 * | 7/2009 | Willis | A01K 85/00 43/42.31 |
| 2015/0208624 | A1 * | 7/2015 | Krohn | A01K 85/00 43/42.49 |

OTHER PUBLICATIONS proluresonline.com, "Bulk Silicone and Rubber Spinnerbait Skirts", http://www.proluresonline.com/s.nl/sc.14/category.22270691/.f, visited Dec. 31, 2022, 1 page.
proluresonline.com, "Bulk Jig Skirts", http://www.proluresonline.com/s.nl/sc.14/category.22270692/.f, visited Dec. 31, 2022, 2 pages.
proluresonline.com, "Bulk Silicone and Rubber Skirt Materials", http://www.proluresonline.com/s.nl/sc.14/category.22270694/.f, visited Dec. 31, 2022, 2 pages.
proluresonline.com, "Rubber Skirt Materials", http://www.proluresonline.com/s.nl/sc.14/category.22270695/.f, visited Dec. 31, 2022, 1 page.
proluresonline.com, "Skirt Collars and Rattles", http://www.proluresonline.com/s.nl/sc.14/category.22270696/.f, visited Dec. 31, 2022, 1 page.
proluresonline.com, "Natural Lure Dressing, Hackle, Deertail, Bucktail",http://www.proluresonline.com/s.nl/sc.14/category.22270737/.f, visited Dec. 31, 2022, 1 page.
proluresonline.com, "Flashabou, Nylon, Microlon", http://www.proluresonline.com/s.nl/sc.14/category.22270738/.f, visited Dec. 31, 2022, 2 pages.

* cited by examiner

*Primary Examiner* — Brady W Frazier
*Assistant Examiner* — Shanna Danielle Glover
(74) *Attorney, Agent, or Firm* — Hooker & Habib, P.C.

(57) ABSTRACT

A fishing lure or fishing bait for angling includes one or more ball chains that assist in attracting fish to the fishing lure or fishing bait during retrieve and enticing fish to strike the fishing lure or fishing bait. The one or more ball chains can be used to dress the fishing bait or the fishing lure or can be incorporated into the fishing lure or fishing bait. Fishing lures and fishing baits having incorporated ball chain as well as being dressed by ball chain are also disclosed.

13 Claims, 5 Drawing Sheets

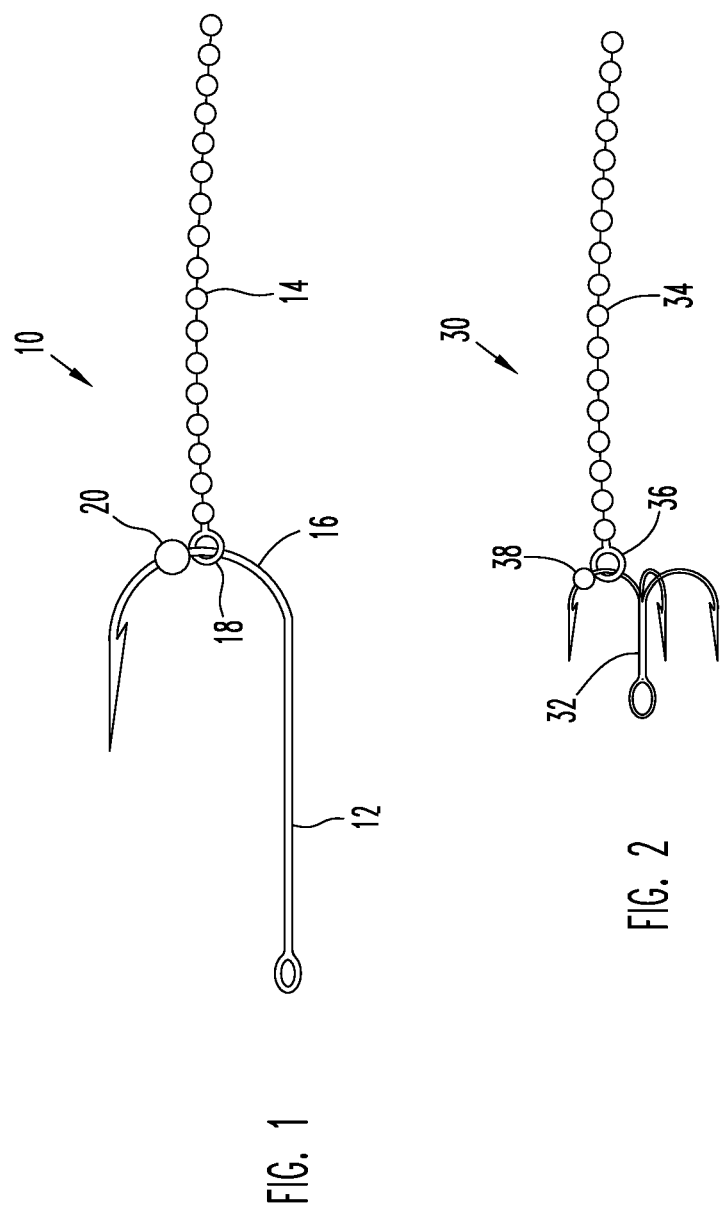

FISHING LURE WITH BALL CHAIN

RELATED APPLICATION

This application claims priority to and the benefit of the filing date of provisional U.S. Patent Application No. 63/254,614 titled "Fishing Lure" and filed Oct. 12, 2021, said provisional patent application on the date of filing of the instant application and incorporated by reference as if fully set forth herein.

FIELD OF THE DISCLOSURE

This disclosure relates generally to fishing lures and fishing baits.

BACKGROUND OF THE DISCLOSURE

Lures used in angling, such as fishing lures and fishing baits, attract fish and entice the fish to strike the lure.

Fishing lures are artificial lures that include a body and a hook or hooks attached to the body. When the fishing lure is cast and then retrieved, the fishing lure while moving through the water mimics the look, action, or some other characteristic of a natural food of the fish that entices a fish to strike the fishing lure. This enables the fishing lure to be used without the need for natural bait.

Fishing baits include natural baits as part of the lure, the bait typically being a minnow, worm, night crawler, squid, pork rind, or other natural bait attached to a fishing hook or fishing hooks. A fishing bait may include colored beads or blades that rotate during retrieve. A fishing bait can also be retrieved through the water like a fishing lure to attract fish and entice a strike.

Some fishing lures, such as some jigs or spinners, can also optionally be used with a natural bait attached to the fishing lure. Adding natural bait to the fishing lure may further attract and entice a fish to strike the fishing lure, although the fishing lure is still useful for angling without the use of natural bait.

A dressed fishing lure or dressed fishing bait includes a flexible material that typically extends away from the body or bait during motion of the lure in the water and further entices fish into noticing and striking the lure. The flexible material is attached to the fishing lure body or a fish hook of the lure. Common dressings include rubber skirts, bucktail (deer hair), squirrel hair, feathers, plastic streamers, and the like.

If the flexible material forming the dressing is located on the fishing lure or fishing bait adjacent to a hook of the fishing lure or fishing bait and extends past the hook during retrieve, the dressed fishing lure or fishing bait has a dressed hook.

There is a need for the use of different materials in making fishing lures and fishing baits. In particular, there is a need for the use of a different material to form a durable, low-cost dressing for fishing lures and fishing baits.

SUMMARY OF THE DISCLOSURE

Disclosed is the use of ball chain with fishing lures and bait lures. Lures in accordance with a first aspect of this disclosure have one or more ball chains attached to the lure to form a dressed fishing lure. Lures in accordance with a second aspect of this application include one or more incorporated into a body of the lure. The incorporated ball chains generate additional noise, rattle, and vibration during the retrieve to entice a fish to strike the lure.

A ball chain, also referred to as a beaded chain, is commonly made of metal or plastic members B interconnected by and spaced apart by the ends of short lengths of wire W extending between adjacent pairs of members. The members B are commonly referred to as "balls" or "beads", but do not necessarily have to be spherical or substantially spherical members. The interconnected, spaced-apart members B form part of a semi-rigid chain having some inherent flexibility. Ball chains can be terminated by, as a non-limiting example, a ring R that enables an end of the ball chain to be attached or otherwise secured to another structure.

FIG. 10 illustrates an embodiment ball chain C formed of like, essentially spherical balls B of identical size. As mentioned, balls of a ball chain are not necessarily spherical, and all the balls of a ball chain do not have to necessarily be the same size.

FIG. 11 illustrates as non-limiting examples a number of different ball chain designs in which the balls of the ball chain can differ in size in the ball chain among one another, differ in shape in the ball chain among one another, and can include holes in addition to those holes that receive the wire W. Ball chain D is formed of alternating larger rounded lozenge and smaller spherical balls. Ball chain E is formed of alternating larger pointed ovate and smaller spherical balls. Ball chain F is formed as alternating melded spherical ball pairs and smaller spherical balls. Ball chain G is formed as like spherical balls having through-openings distributed around an equator of each ball.

Common uses of ball chain are as pull cords, keychains, keeper chains for ink pens or the like, or other light duty applications where a flexible and lightweight chain is desirable.

Non-limiting embodiments of a ball chain are disclosed in Goodridge et al. U.S. Pat. No. 1,692,649 incorporated by reference as if fully set forth herein.

Ball chains are available in standard ball sizes; for example, a #1 ball chain has a ball diameter of 0.072 inches. But ball chain can also be made in non-standard sizes. Ball chains are typically made of steel, aluminum, brass, copper alloy, stainless steel, and plastic. Ball chains are available commercially from, for example, McMaster-Carr Supply Company, Elmhurst, Illinois 60126.

In some embodiments of fishing lures and fishing baits in accordance with this disclosure, one or more ball chains of the fishing lure or fishing bait are used as a dressing.

The inventor has found that ball chain used as a dressing accentuates the action of the lure during the retrieve. The relative flexibility of the ball chain enables the ball chain itself to have an enticing action during retrieve generated by the action of the lure and by the inherent flexibility of the ball chain itself.

The one or more ball chains in embodiments can be attached to a single fish hook of the lure or to multiple fish hooks of the lure. The ball chains attached to a fish hook or a common mounting member such as a split ring attaching the fish hook to a lure body extend way from the fish hook and dress the fish hook. The ball chain dressing the fish hook provide additional action during the retrieve to attract and entice fish to strike the lure. The one or more ball chains can be attached to the fish hook by a ring or the like attached to an end of the one or more ball chains. The fish hook can be a formed as a single fish hook or as a multiple fish hook such as a double hook or treble hook.

Multiple separate ball chains can be directly or indirectly attached to the lure to dress the lure. The multiple ball chains can impact or otherwise interact with one another or other components of the lure during the retrieve to affect the action of the ball chains and generate noise during the retrieve to attract and entice fish to strike the lure.

Metal ball chains are commonly preferred for most lure applications because of their durability, ability to take different surface finishes, and ability to interact and make noise. Plastic ball chain, however, is a viable design option available to the lure designer.

The length of a ball chain, the size and number of balls of the ball chain, and the material forming the ball chain can be selected based on the size and weight of the lure, the desired action to be generated by the ball chain, and the number of ball chains used as dressing. The color and finish of the ball chain can vary to offer anglers a choice of lures to fit fishing conditions. A ball chain may have balls of different colors, materials, reflectivity, shapes, and/or sizes forming the ball chain.

The inventor has also found that ball chain incorporated into the body of a fishing lure or fishing bait can also improve "fishability" of the lure. The ball chain can, in possible embodiments, be placed inside an otherwise empty chamber defined by the body that enables relative motion of the ball chain with respect to the body. Vibration of the body during retrieve causes the ball chain to move relative to the body and impact the inside of the compartment, generating noise ("chatter") and vibration that further attracts and entices fish to strike the lure.

Ball chain incorporated into the body of the fishing lure functions to generate noise and additional vibration during the retrieve without necessarily adding substantial weight to the fishing lure. The ball chain can extend along a straight path or a curved path to conform to the shape of the compartment and to the body of the fishing lure.

The inventor has further found that ball chain itself can form the body of a fishing lure or fishing bait. The inherent flexibility of the ball chain, the ability to modify the external finish and appearance of the ball chain, and the ability to add a lip to the ball chain to further generate vibration of the ball chain and control lure depth during the retrieve enables the ball chain to form an effective and relatively inexpensive fishing lure that attracts and entices fish to strike the lure.

In sum, the design possibilities of ball chain provides the lure designer more versatility and more options in designing a lure that will better attract and entice fish to strike the lure.

Other objects and features of the disclosure will become apparent as the description proceeds, especially when taken in conjunction with the accompanying drawing sheets illustrating one or more illustrative non-limiting embodiments.

BRIEF DESCRIPTION OF THE DRAWINGS

FIG. 1 illustrates a fishing bait formed as a single hook dressed with a ball chain in accordance with this disclosure.

FIG. 2 illustrates a portion of a fishing bait or fishing lure formed as a treble hook dressed with a ball chain in accordance with this disclosure.

DETAILED DESCRIPTION

FIGS. 1-9 illustrate a number of different embodiments of fishing baits and/or fishing lures that include ball chain in accordance with this disclosure.

Figure 8:
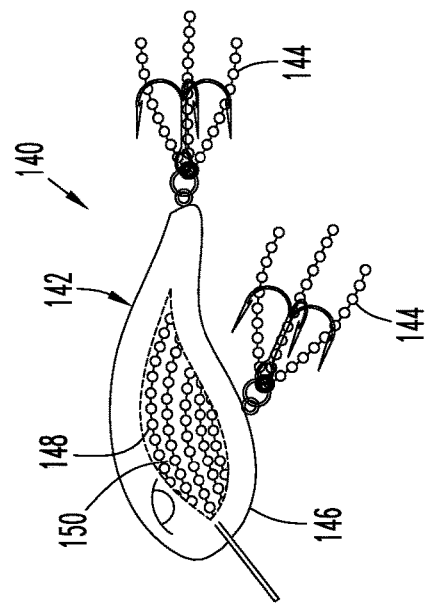
FIG. 8 illustrates a fishing lure incorporating ball chain in the body of the fishing lure in accordance with this disclosure, the fishing lure also dressed with ball chain in accordance with this disclosure.
Figure 9:
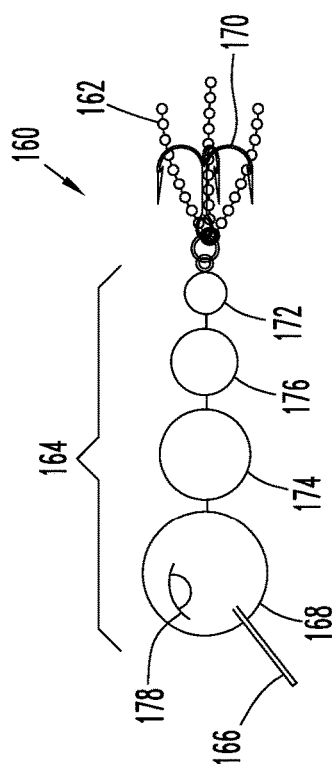
FIG. 9 illustrates a fishing lure having a body formed by a ball chain in accordance with this disclosure.
Figure 10:
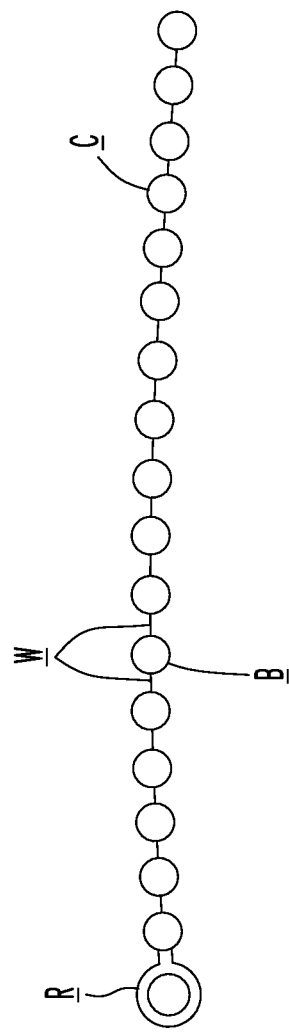
FIG. 10 illustrates a prior art ball chain used in embodiments of fishing lures and bait lures in accordance with this disclosure.
Figure 11:
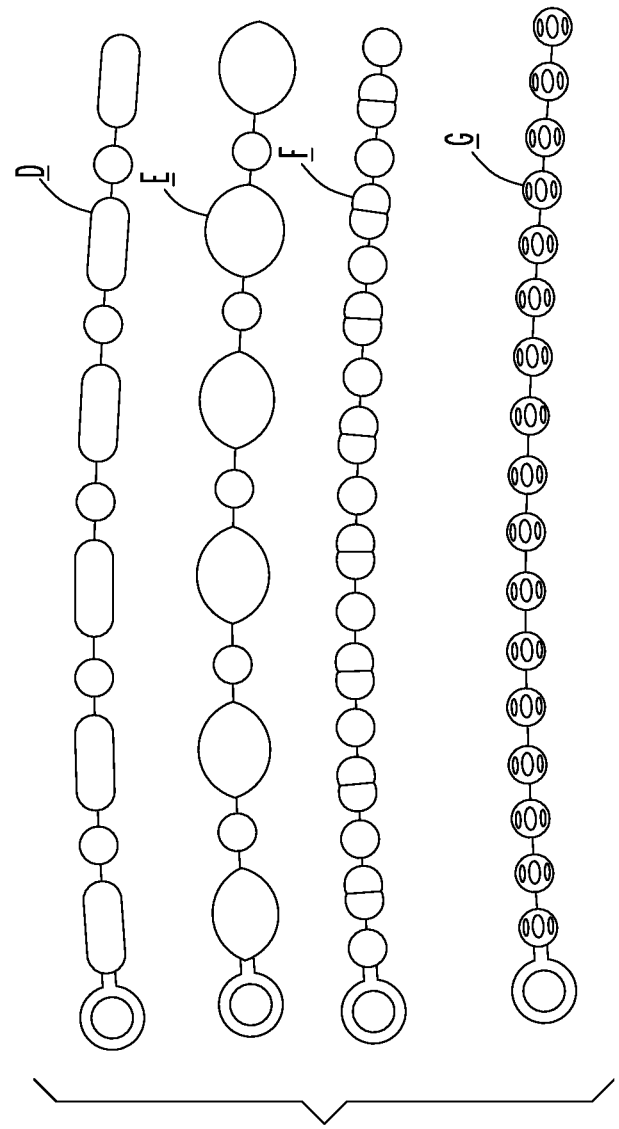
FIG. 11 illustrates a number of prior art ball chains that can be used in other embodiments of fishing lures and bait lures in accordance with this disclosure.

To simplify the drawings, the embodiments of FIGS. 1-9 incorporate ball chain similar to the ball chain shown in FIG. 10. This is not intended to be limiting. Ball chains having different designs, such as, for example, the ball chain designs shown in FIG. 11, can be used in the fishing baits and/or fishing lures instead of, or in addition to, the ball chain design shown in FIG. 1.

FIG. 1 illustrates a fishing bait or a portion of a fishing lure 10 formed from a barbed "J"-shaped fishing hook 12 and a ball chain 14 dressing the hook. The ball chain is attached to the bend 16 of the hook by a split ring 18 connected to and terminating an end of the ball chain. A bead 20 disposed on the bend prevents the ball chain from slipping off the pointed end of the hook during casting and retrieval of the lure.

The illustrated ball chain 14 is made from #1 aluminum ball chain (0.072 inch diameter balls), is silver in color, and has a developed, stretched out length of about 2¼ inches.

In use, the fishing bait 10 with a natural bait attached to the fishing hook or the fishing lure 10 is cast and retrieved by an angler in a conventional manner. During the retrieve, the ball chain 14 extends away from the bend of the hook 12 as shown in FIG. 1. The ball chain generates movement and flash during the retrieve that attracts and entices fish to strike the lure 10.

FIG. 2 illustrates a fishing bait or a portion of a fishing lure 30 having a treble hook 32 and a single ball chain 34 dressing the treble hook. The ball chain 34 is attached to a hook of the treble hook by a split ring 36 and is retained on the hook by a bead 38. During retrieve of the fishing bait or fishing lure 30, the ball chain 34 attracts and entices fish to strike the fishing bait or fishing lure 30.

Figure 3:
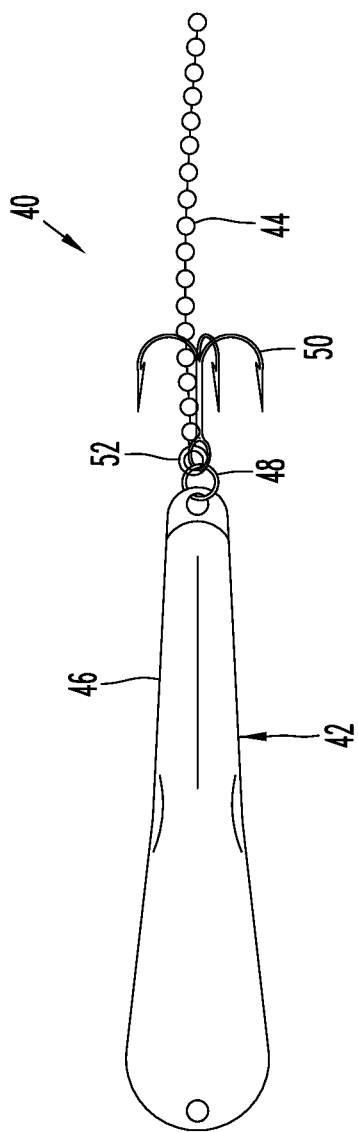
FIG. 3 illustrates a spoon dressed with a ball chain in accordance with this disclosure.

FIG. 3 illustrates a fishing lure 40 formed as a metal spoon 42 dressed with a ball chain 44. The spoon 42 includes an elongate metal body 46. A split ring 48 is attached to an end of the body and attaches a treble hook 50 to the body. The ball chain is attached to the lure split ring 48 by a smaller split ring 52 connected to and terminating an end of the ball chain.

Figure 4:
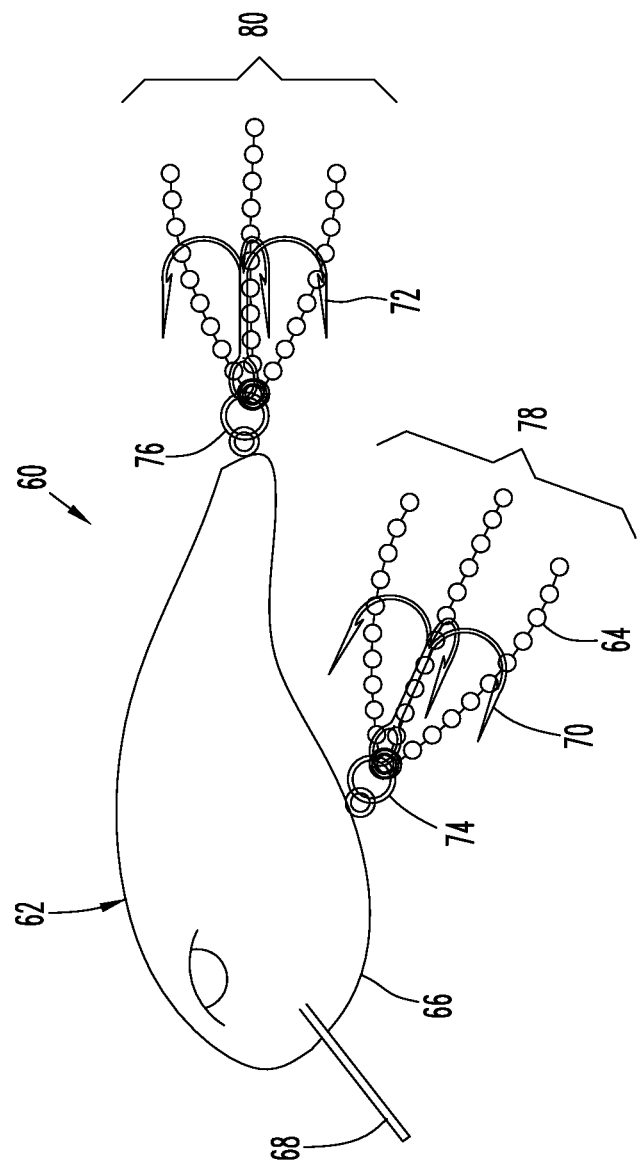
FIG. 4 illustrates a crankbait dressed with ball chain in accordance with this disclosure.

During the retrieve of the fishing lure 40, the ball chain 44 extends away from the spoon 42 as shown in FIG. 4, dressing the hook 50. The spoon 42 wobbles during retrieve, generating movement and vibration in the ball chain 44. The movement and flash of the ball chain 44 during retrieve further attracts and entices fish to strike the fishing lure 40.

FIG. 4 illustrates a fishing lure 60 formed as a crankbait 62 dressed with a number of ball chains 64. The crankbait 62 includes a body 66, a bill 68 disposed on the forward end of the body, and a pair of forward and back treble hooks 70, 72 attached by split rings 74, 76 to the body. A first set 78 of the ball chains 64 are attached to the split ring 74 by split rings connected to the ends of the ball chains. The set 78 of ball chains dress the forward treble hook 70. A second set 80 of the ball chains 64 are attached to the split ring 76 by split rings connected to the ends of the ball chains. The set 80 of ball chains dress the back treble hook 72.

Embodiments of the fishing lure 60 can be designed to float in the water when not retrieved, suspend in the water when not retrieved, or sink in the water when not retrieved.

Figure 5:
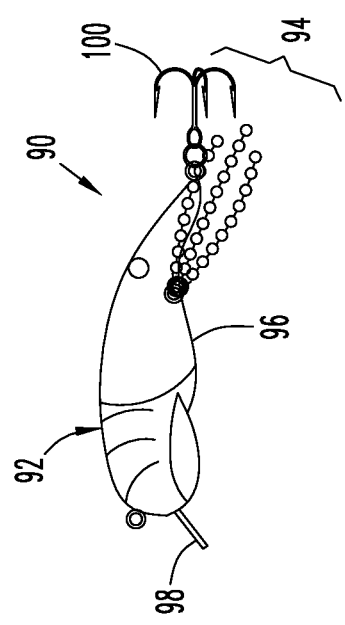
FIG. 5 illustrates a swimbait dressed with ball chain in accordance with this disclosure.

During the retrieve of the fishing lure 60, the sets of ball chains 78, 80 extend away from the crankbait 62 as shown in FIG. 5. The crankbait 62 wobbles during retrieve, generating movement and vibration in the sets 78, 80 of ball chains. The ball chains in each ball chain set 78, 80 may also interact with each other, generating noise. The movement, flash, rattle, and noise of the sets of ball chains further attracts and entices fish to strike the fishing lure 60.

FIG. 5 illustrates a fishing lure 90 formed as a swimbait 92 dressed with a set of ball chains 94. The swimbait 92 includes a flexible body 96, a bill 98 disposed on the forward end of the body, and a trailing treble hook 100 attached to a trailing end of the body. The set of ball chains 94 include a number of ball chains attached to an exposed screw eye 102 attached to the body and spaced forwardly from the treble hook. The ball chains are attached to the screw eye by split rings by split rings connected to the ends of the ball chains.

Figure 6:
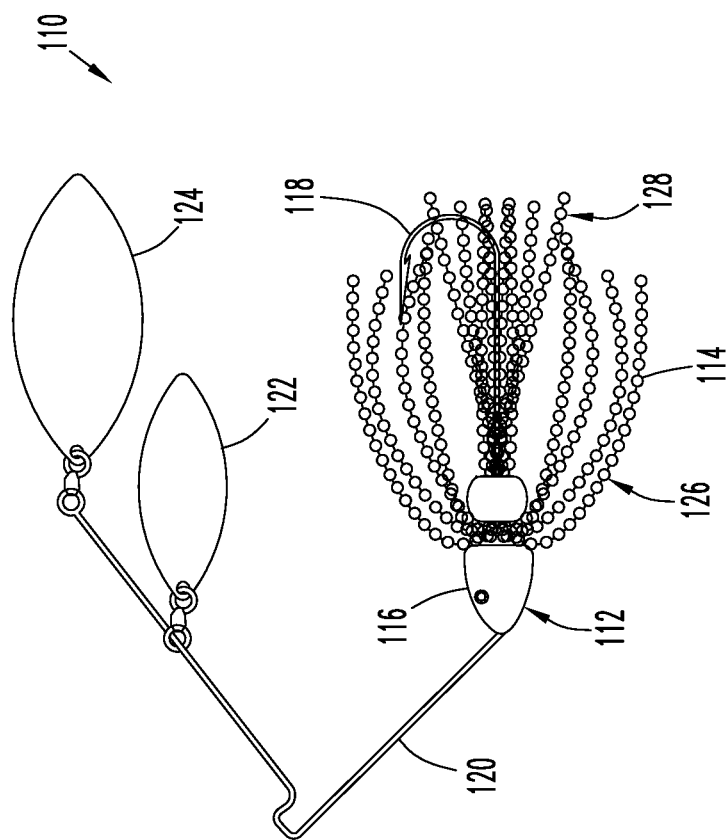
FIG. 6 illustrates a spinnerbait dressed with ball chain in accordance with this disclosure.

During the retrieve of the fishing lure 90, the set of ball chains 94 extend away from the swimbait 92 as shown in FIG. 6. The swimbait 92 wobbles, generating movement and vibration in the set 94 of ball chains. The ball chains may also interact with each other and the swimbait 92, generating noise. The movement, flash, rattle, and noise of the set of ball chains further attracts and entices fish to strike the fishing lure 90.

FIG. 6 illustrates a fishing lure 110 formed as a spinnerbait 112 dressed with a number of ball chains 114. The spinnerbait 112 includes a lead or steel body 116, a single fish hook 118 extending out of the trailing end of the body, and a bent wire 120 extending out of the forward end of the body. The bent wire extends from the body to a forward end of the spinnerbait and extends from the forward end away and above the body to carry a pair of blades 122, 124. The ball chains 114 includes a first set 126 of ball chains spaced around and connected to an intermediate portion of the body 116, and a second set 128 of ball chains attached to and extending from the trailing end of the body 116. The set 126 of ball chains dress the body 116. The set 128 of ball chains dress the hook 118.

During the retrieve of the fishing lure 110, the sets of ball chains 126, 128 extend away from the body 116 of the spinnerbait 112 as shown in FIG. 6. Rotation of the blades 122, 124 causes the spinnerbait 112 to vibrate and wobble, generating movement and vibration in the sets 126, 128 of ball chains. The ball chains may also interact with each other and the body 116, generating rattle and noise. The movement, flash, rattle, and noise of the sets of ball chains further attracts and entices fish to strike the fishing lure 110.

Figure 7:
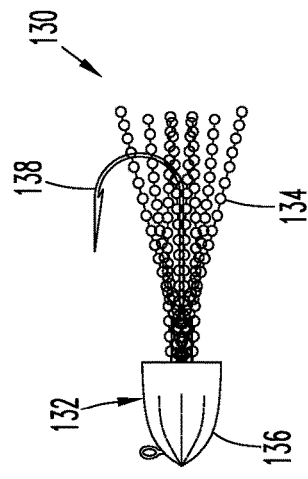
FIG. 7 illustrates a jig dressed with ball chain in accordance with this disclosure.

FIG. 7 illustrates a fishing lure 130 formed as a jig 132 dressed with a number of ball chains 134. The jig 132 includes a lead or steel head/body 136 and a single fish hook 138 extending out from the trailing end of the body. The ball chains 134 are attached to and extend from the trailing end of the body. The ball chains 134 dress the hook 138.

The fishing lure 130 can be retrieved horizontally but is also often retrieved (jigged) vertically by raising and lowering the fishing lure 130. During horizontal or upward retrieval of the fishing lure 130, the ball chains 134 extend away from the body 136 as shown in FIG. 7. Allowing the jig to drop vertically when retrieving or jigging causes the ball chains to flutter and change direction, and interact with the body 136 generating rattle and noise. The movement, flash, rattle, and noise of the ball chains further attracts and entices fish to strike the jig 132.

FIG. 8 illustrates a fishing lure 140 formed as a crankbait 142 dressed with a number of ball chains 144. The crankbait 142 has a body 146 like the crankbait body 66 shown in FIG. 4. The fishing lure 140 differs from the fishing lure 60 only in that the body 146 incorporates a number of internal ball chains disposed inside an internal cavity or chamber 150 defined in the body 146. The chamber and the ball chains in the chamber generally extend along a curved path so that the chamber and the ball chains conform to the outer shape of the body 146 as can be seen in FIG. 8. The internal ball chains 148 are loose in the chamber and are not fixed to the walls defining the chamber or any other part of the body 146.

During the retrieve of the fishing lure 140, the body 146 wobbles. Wobbling of the body, in addition to causing movement of the external ball chains 144, causes the internal ball chains to move inside the chamber 150. Movement of the internal ball chains causes the internal ball chains to interact with themselves and the walls of the chamber, generating rattle and noise that emanates from the body 146. The internal ball chains also generate vibration of the body 146 superimposed over the wobble of the body during retrieve. The rattle, noise, vibration, and vibration generated by the internal ball chains further attracts and entices fish to strike the fishing lure 140.

Embodiments of a lure incorporating ball chain in the lure may also omit ball chain dressing the lure, that is, it is not required that lures must both incorporate ball chain and be dressed with ball chain.

FIG. 9 illustrates a fishing lure 160 dressed with a number of ball chains 162. The fishing lure has a body 164 itself formed as a 4-ball ball chain. A bill 166 is attached to the ball 168 located at the leading end of the ball chain. A treble hook 170 is attached by a split ring to the ball 172 located at the trailing end of the ball chain. The ball chains 162 are attached to the split ring and dress the treble hook 170.

The illustrated body ball chain 164 includes a leading ball 168, a trailing ball 172, and two intermediate balls 174, 176 located between the leading and trailing balls. The four balls are graduated in diameter, the diameter of the balls decreasing from the leading ball towards the trailing ball. In the illustrated embodiment the leading ball 168 has a diameter of 0.90 inches, the ball 174 has a diameter of 0.65 inches, the ball 168 has a diameter of 0.48 inches, and the trailing ball 172 has a diameter of 0.30 inches. Other embodiments of the fishing lure 160 can be constructed made of a ball chain having fewer balls, more balls, balls having different diameters than the illustrated balls, and can be formed of balls having the same diameter.

The leading ball 168 includes painted decoration 178 placed on the leading ball 168. The illustrated decoration defines "eyes" on the leading ball to have the fishing lure 160 mimic the appearance of a minnow. Other decorations, paints, and finishes can be placed on the balls 168, 172, 174, 176 as desired by the lure designer.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in size, length, and color of the ball chain, the number of ball chains, other types of fishing lure and fishing bait bodies (for non-limiting examples, a plug or crankbait, a top-water bait, a spinner bait, a soft body lure, and the like), how or where the ball chain dressing is connected to the fishing lure or fishing bait, simultaneous use of other dressings in addition to ball chain dressing, and the like as well as such changes and alterations that fall within the purview of the following claims.

What is claimed is:

1. A lure for angling comprising:
a body,
a fish hook,
a first attachment member, and
at least one ball chain;
the fish hook being outside of the body,
the fish hook being attached to the body by the first attachment member,
the first attachment member being connected to the body and the first attachment member being connected to the fish hook; and
each ball chain of the at least one ball chain being outside of the body and comprising a respective second attachment member,
each ball chain of the at least one ball chain being attached to the first attachment member by the second attachment member,
the second attachment member being non-fixedly attached to the first attachment member and being capable of moving a distance along the first attachment member;
each ball chain of the at least one ball chain having a length and comprising a first end being attached to the second attachment member and an opposite second end spaced from the first end by the length of the ball chain, the second end being a free, unattached end of the ball chain.

2. The lure of claim 1, wherein the first attachment member is a first ring, the first ring being disposed outside of the body, the first ring being connected to the body and the first ring being connected to the fish hook; and
each ball chain of the at least one ball chain is attached to the first ring by a respective second attachment member.

3. The lure of claim 2, wherein the second attachment member of each ball chain of the at least one ball chain is a second ring attaching the ball chain to the first ring.

4. The lure of claim 3, wherein the at least one ball chain comprises a plurality of ball chains, wherein the respective second ring of each ball chain of the plurality of ball chains attaches each ball chain to the first ring.

5. The lure of claim 3, wherein the second ring of each ball chain of the at least one ball chain is a split ring.

6. The lure of claim 2, wherein the first ring is a split ring.

7. The lure of claim 1, comprising at least one additional ball chain, each ball chain of the at least one additional ball chain being disposed in a chamber disposed inside of the body.

8. The lure of claim 7, wherein the chamber extends along a curved path and each ball chain of the at least one additional ball chain conforms with the curved path.

9. The lure of claim 7, wherein each ball chain of the at least one additional ball chain is loose in the chamber.

10. The lure of claim 1, wherein each ball chain of the at least one ball chain is formed from a plurality of interconnected, essentially spherical balls of essentially identical size.

11. The lure of claim 1, wherein each ball chain of the at least one ball chain is formed from a plurality of interconnected, non-spherical balls.

12. The lure of claim 1, wherein each ball chain of the at least one ball chain is formed from a plurality of balls, the plurality of balls having at least one of the following characteristics (a), (b), and (c): (a) differing in size in the ball chain among one another, (b) differing in shape in the ball chain among one another, and (c) including additional ball openings in addition to ball openings that receive interconnections between adjacent balls of the ball chain.

13. The lure of claim 1, wherein each ball chain of the at least one ball chain is configured to dress the fish hook.

* * * * *